(12) United States Patent
Vogt et al.

(10) Patent No.: US 8,873,578 B2
(45) Date of Patent: Oct. 28, 2014

(54) METHOD AND APPARATUS FOR USE IN A COMMUNICATIONS NETWORK (75) Inventors: Christian Vogt, San Jose, CA (US); Zoltán Turányi, Szentendre (HU)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 450 days.

(21) Appl. No.: 13/129,016

(22) PCT Filed: Nov. 12, 2008

(86) PCT No.: PCT/EP2008/065357
§ 371 (c)(1),
(2), (4) Date: May 12, 2011

(87) PCT Pub. No.: WO2010/054686
PCT Pub. Date: May 20, 2010

(65) Prior Publication Data
US 2011/0216680 A1 Sep. 8, 2011

(51) Int. Cl.
H04J 3/16 (2006.01)
H04B 7/00 (2006.01)
H04W 60/00 (2009.01)
H04L 29/12 (2006.01)
H04W 8/26 (2009.01)
H04W 88/18 (2009.01)
H04W 80/04 (2009.01)

(52) U.S. Cl.
CPC ......... *H04W 60/005* (2013.01); *H04L 61/6077* (2013.01); *H04W 8/26* (2013.01); *H04W 88/182* (2013.01); *H04W 80/04* (2013.01); *H04L 61/2528* (2013.01); *H04L 61/2525* (2013.01)
USPC ..................... 370/465; 370/466; 370/310

(58) Field of Classification Search
None
See application file for complete search history.

(56) References Cited

U.S. PATENT DOCUMENTS

| | | | |
|---|---|---|---|
| 7,161,897 B1 * | 1/2007 | Davies et al. | 370/217 |
| 8,031,674 B2 * | 10/2011 | Weniger et al. | 370/331 |
| 8,103,278 B2 * | 1/2012 | Tsao | 455/442 |
| 8,150,976 B1 * | 4/2012 | Zhang et al. | 709/227 |
| 8,219,690 B2 * | 7/2012 | Shigeta et al. | 709/227 |
| 8,219,708 B2 * | 7/2012 | Bachmann et al. | 709/238 |
| 8,391,226 B2 * | 3/2013 | Rune | 370/329 |
| 2004/0141513 A1 * | 7/2004 | Takechi et al. | 370/401 |
| 2007/0047490 A1 * | 3/2007 | Haverinen et al. | 370/331 |
| 2007/0081512 A1 * | 4/2007 | Takeda et al. | 370/349 |
| 2008/0256220 A1 * | 10/2008 | Bachmann et al. | 709/222 |
| 2009/0245150 A1 * | 10/2009 | Tsao | 370/311 |
| 2009/0282449 A1 * | 11/2009 | Lee | 725/110 |
| 2010/0128696 A1 * | 5/2010 | Fantini et al. | 370/331 |
| 2012/0238266 A1 * | 9/2012 | Bachmann et al. | 455/433 |

* cited by examiner

Primary Examiner — Hassan Phillips
Assistant Examiner — Hicham Foud (57) ABSTRACT A method of routing traffic in a communications network employing Proxy Mobile IP is disclosed. According to the method, a traffic flow has been transferred from a first interface of a multi-homed mobile node, having a first IP address, to a second interface of the multi-homed mobile node, having a second IP address. The method further involves, at the mobile node and at a mobility anchor function, performing forward and reverse address translation between the first IP address and the second IP address.

5 Claims, 4 Drawing Sheets

METHOD AND APPARATUS FOR USE IN A COMMUNICATIONS NETWORK

FIELD OF THE INVENTION

The present invention relates to a method and apparatus for use in a communications networks, and in particular to a method and apparatus for use in a Proxy Mobile IP communications network.

BACKGROUND

Mobile IP is a mechanism for maintaining transparent network connectivity to and from a mobile node (MN), such as a mobile terminal or telephone, over an IP based network whilst the mobile node is roaming within or across network boundaries. Mobile IP enables a mobile node (or rather user) to be addressed by a fixed IP address (a "Home Address") allocated by its home network, regardless of the network to which it is currently physically attached. The Home Address causes all traffic sent to the Home Address to be routed through the home network. Ongoing network connections to and from a mobile node can be maintained even as the mobile node is moving from one subnet to another. Mobile IP can be implemented using IP version 4 (IPv4) or IP version 6 (IPv6), although IPv6 is generally preferred as IPv4 has a number of limitations in a mobile environment. The IPv6 protocol is specified in RFC 2460, whilst Mobile IP using IPv6 is specified in IETF RFC 3775, 'Mobility Support in IPv6'.

According to Mobile IPv6, a mobile node is always reachable via its Home Address. However, while away from its home IP subnet (Home Subnet), a mobile node is also associated with a Care-of Address that indicates the mobile node's current location. The mobile node can acquire its Care-of Address through a conventional IPv6 mechanism called "auto-configuration" within the visited IP subnet. The association of the mobile node's Home Address and the Care-of Address is known as a "Binding". A router in the Home Subnet, known as the "Home Agent", maintains a record of the current Binding of the mobile node. Mobile IPv6 requires functionality in the TCP/IP Protocol stack of a mobile node, as there must be an exchange of signalling messages between the mobile node and its Home Agent to enable the creation and maintenance of the binding between the mobile node's Home Address and its Care-of-Address.

Proxy Mobile IPv6 (PMIP) is a new standard currently being developed by the Internet Engineering Task Force (IETF) (see IETF Request for Comments 5213). PMIP is a network-controlled IP mobility protocol that is transparent to the mobile node and will be used for mobility management in the 3GPP Evolved Packet System. This approach to supporting mobility does not require the mobile node to be involved in the exchange of signalling messages with a Home Agent. A proxy mobility agent in the network performs the signalling with the Home Agent and performs the mobility management on behalf of the mobile node.

Figure 1:
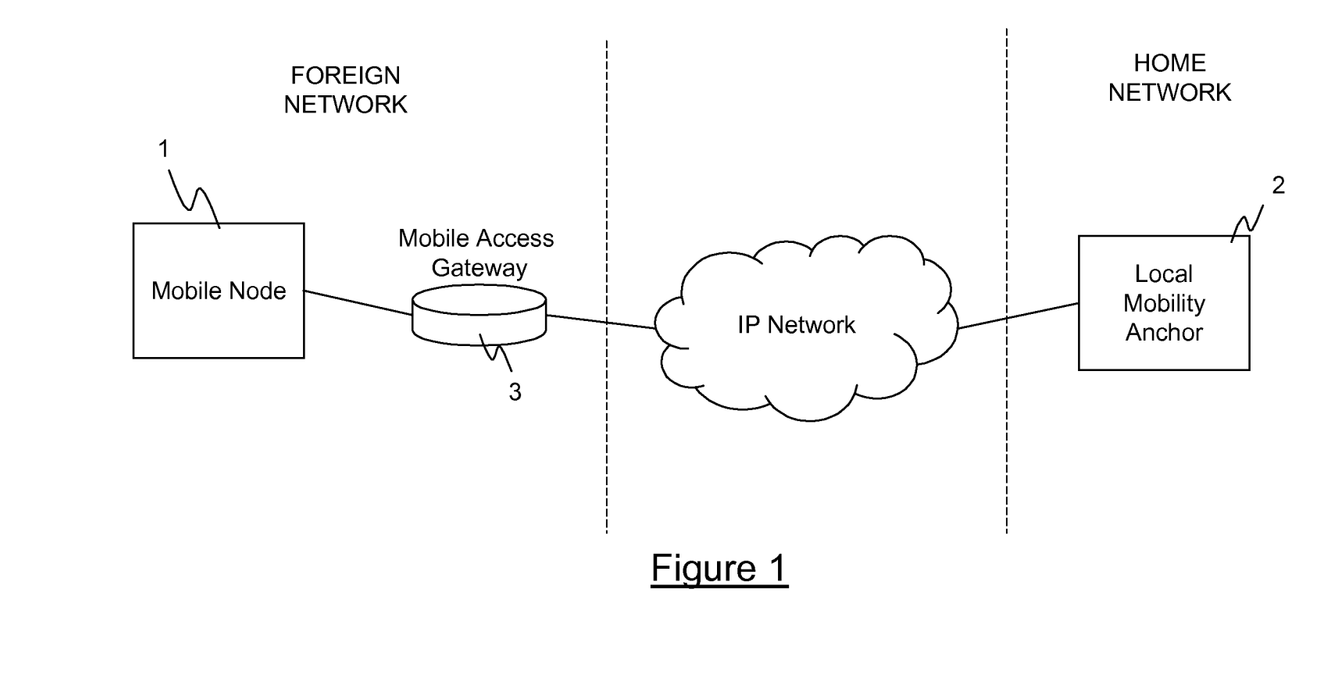
FIG. 1 illustrates schematically the architecture of a Proxy Mobile IPv6 communications network.

The architecture of a Proxy Mobile IPv6 communications network is shown in FIG. 1. The core functional entities in PMIP are the local mobility anchor (LMA) 2 and the mobile access gateway (MAG) 3. The local mobility anchor 2 is the Home Agent for the mobile node in Proxy Mobile IPv6. The local mobility anchor 2 is responsible for maintaining the mobile node's 1 reachability state and is the anchor point for the mobile node's home network prefix. The mobile access gateway 3 is the entity that performs the mobility management on behalf of a mobile node 1 and it resides on the access link where the mobile node 1 is attached. The home network prefix is assigned to the link between the mobile node 1 and the mobile access gateway 3. The mobile access gateway 3 is responsible for detecting the mobile node's movements to and from the access link and for initiating binding registrations to the mobile node's local mobility anchor 2.

A bidirectional tunnel between the local mobility anchor 2 and the mobile access gateway 3 ensures that the mobile node 1 can communicate as if it was physically located in its home network. The local mobility anchor 2 and mobile access gateway 3 perform the necessary encapsulation and decapsulation on behalf of the mobile node 1. The local mobility anchor 2 receives any packets that are sent by any correspondent node to the mobile node and forwards these received packets to the mobile access gateway 3 through the bi-directional tunnel. The mobile access gateway 3 removes the outer header from the packet and forwards the packet on the access link to the mobile node 1. Any packet that the mobile node 1 sends to any correspondent node will be received by the mobile access gateway 3 and will be sent to its local mobility anchor 2 through the bi-directional tunnel. The local mobility anchor 2 removes the outer header and routes the packet to the correspondent node. In the Evolved Packet System, the Packet Data Node (PDN) gateway takes on the role of the local mobility anchor, and serving gateways act as the mobile access gateway.

A multi-homed mobile node is a mobile node that simultaneously attaches to the Proxy Mobile IPv6 domain through multiple interfaces. Each of the attached interfaces of a multi-homed mobile node is assigned one or more unique home network prefixes. However, if a multi-homed mobile node performs a handoff by moving its address configuration from one interface to the other, the local mobility anchor will assign the same home network prefix(es) to the new interface, as are assigned to the old interface. As such, PMIP requires the old interface to be disabled after the handover in order to avoid a conflict between the existing IP configuration on the old interface and the newly established, identical IP configuration on the new interface. Therefore traffic can only be handed over on a per-interface basis. This lack of support for the hand-over of individual traffic flows between the interfaces of a multi-homed mobile node in Proxy Mobile IPv6 is a crucial shortfall given the desire of many operators to support this feature for simultaneous multi-access.

SUMMARY

It is an object of the present invention to provide hand-over of individual traffic flows between interfaces of a multi-homed mobile node using Proxy Mobile IPv6.

According to a first aspect of the present invention there is provided a method of routing traffic in a communications network employing Proxy Mobile IP, in which a traffic flow has been transferred from a first interface of a multi-homed mobile node, having a first IP address, to a second interface of the multi-homed mobile node, having a second IP address. The method comprises, at the mobile node and at a mobility anchor function, performing forward and reverse address translation between the first IP address and the second IP address.

For packets of the transferred traffic flow that are sent from the mobile node, the mobile node translates the first IP address to the second IP address; and the mobility anchor function translates the second IP address to the first IP address. For packets of the transferred traffic flow that are sent to the mobile node, the mobility anchor function translates the first IP address to the second IP address; and the mobile node translates the second IP address to the first IP address.

Embodiments of the present invention provide for redirection of individual traffic flows, wherein the redirection is transparent to all entities between the mobile node and the local mobility anchor that have negotiated the redirection. Furthermore, address translation ensures that mobile node always uses an IP address that is configured on the sending/receiving interface.

According to a second aspect of the present invention there is provided a method of routing traffic at a multi-homed mobile node employing Proxy Mobile IP, in which a traffic flow has been transferred from a first interface of the multi-homed mobile node, having a first IP address, to a second interface of the multi-homed mobile node, having a second IP address. The method comprises performing forward and reverse address translation between the first IP address and the second IP address.

For packets of the transferred traffic flow sent from the mobile node, the first IP address is translated to the second IP address. For packets of the transferred traffic flow received at the mobile node, the second IP address is translated to the first IP address.

According to a third aspect of the present invention there is provided a method of routing traffic at a mobility anchor function employing Proxy Mobile IP, in which a traffic flow has been transferred from a first interface of a multi-homed mobile node, having a first IP address, to a second interface of the multi-homed mobile node, having a second IP address. The method comprises performing forward and reverse address translation between the first IP address and the second IP address.

For packets of the transferred traffic flow received from the mobile node, the second IP address is translated to the first IP address. For packets of the transferred traffic flow sent to the mobile node, the first IP address is translated to the second IP address.

According to a fourth aspect of the present invention there is provided an apparatus configured to provide a mobility anchor function for use in a communications network employing Proxy Mobile IP. The apparatus comprises a transmitter for sending packets to a multi-homed mobile node, a receiver for receiving packets from the multi-homed mobile node, and a translator unit for performing forward and reverse address translation between a first IP address and a second IP address for packets of a traffic flow that are sent to and received from the multi-homed mobile node, the traffic flow having been transferred from a first interface of the multi-homed mobile node, having the first IP address, to a second interface of the multi-homed mobile node, having the second IP address.

According to a fifth aspect of the present invention there is provided an apparatus configured to operate as a multi-homed mobile node for use in a communications network employing Proxy Mobile IP. The apparatus comprises a transmitter for sending packets to a mobility anchor function, a receiver for receiving packets from a mobility anchor function, and a translator unit for performing forward and reverse address translation between a first IP address and a second IP address for packets of a traffic flow that are sent to and received from the mobility anchor function, the traffic flow having been transferred from a first interface of the multi-homed mobile node, having the first IP address, to a second interface of the multi-homed mobile node, having the second IP address.

According to a sixth aspect of the present invention there is provided a method of initiating re-routing of a traffic flow from a first interface of a multi-homed mobile node, having a first IP address, to a second interface of the multi-homed mobile node, having a second IP address, in a communications network employing Proxy Mobile IP. The method comprises, at a mobility anchor function, sending a route update message to the second IP address, the route update message containing a specification of the traffic flow to be re-routed. At the mobile node, creating an association between the first IP address and the second IP address for the specified traffic flow, and sending a route update acknowledge message to the mobility anchor function. At the mobility anchor function, in response to receipt of the route update acknowledge message, creating an association between the first IP address and the second IP address for the specified traffic flow.

According to a seventh aspect of the present invention there is provided a method of initiating re-routing a traffic flow, at a mobility anchor function, from a first interface of a multi-homed mobile node, having a first IP address, to a second interface of the multi-homed mobile node, having a second IP address, in a communications network employing Proxy Mobile IP. The method comprises sending a route update message to the second IP address, the route update message containing a specification of the traffic flow to be re-routed, receiving a route update acknowledge message from the mobile node, and creating an association between the first IP address and the second IP address for the specified traffic flow.

Embodiments of the present invention enable the network to initiate redirection of packet flows and to deny redirection requests initiated by a mobile node.

According to an eighth aspect of the present invention there is provided an apparatus configured to provide a mobility anchor function for use in a communications network employing Proxy Mobile IP. The apparatus comprises a transmitter for sending a route update message to a mobile node, the route update message containing a specification of a traffic flow to be re-routed from a first interface of a multi-homed mobile node, having a first IP address, to a second interface of the multi-homed mobile node, having a second IP address, a receiver for receiving a route update acknowledge message from the mobile node, and a binding unit for creating an association between the first IP address and the second IP address for the specified traffic flow.

According to a ninth aspect of the present invention there is provided an apparatus configured to operate as a multi-homed mobile node for use in a communications network employing Proxy Mobile IP. The apparatus comprises a receiver for receiving a route update message from a mobility anchor function, the route update message containing a specification of a traffic flow to be re-routed from a first interface of the multi-homed mobile node, having a first IP address, to a second interface of the multi-homed mobile node, having a second IP address, a transmitter for sending a route update acknowledge message to the mobility anchor function, and a binding unit for creating an association between the first IP address and the second IP address for the specified traffic flow.

According to a tenth aspect of the present invention there is provided a method of initiating re-routing a traffic flow from a first interface of a multi-homed mobile node, having a first IP address, to a second interface of the multi-homed mobile node, having a second IP address, in a communications network employing Proxy Mobile IP. The method comprises, at the mobile node, sending a route update request message to a mobility anchor function, the route update request message containing a specification of the traffic flow to be re-routed. At the mobility anchor function, in response to receipt of the route update request message, accepting the route update request and sending a route update message to the mobile node. At the mobile node, creating an association between the first IP address and the second IP address for the specified traffic flow, and sending a route update acknowledge message to the mobility anchor function. At the mobility anchor function, in response to receipt of the route update acknowledge message, creating an association between the first IP address and the second IP address for the specified traffic flow.

According to a eleventh aspect of the present invention there is provided a method of initiating re-routing a traffic flow, at a multi-homed mobile node, from a first interface of the multi-homed mobile node, having a first IP address, to a second interface of the multi-homed mobile node, having a second IP address, in a communications network employing Proxy Mobile IP. The method comprises sending a route update request message to a mobility anchor function, the route update request message containing a specification of the traffic flow to be re-routed, receiving a route update message from the mobility anchor function, the route update message acknowledging acceptance of the route update request, and creating an association between the first IP address and the second IP address for the specified traffic flow, and sending a route update acknowledge message to the mobility anchor function.

According to a twelfth aspect of the present invention there is provided an apparatus configured to operate as a multi-homed mobile node for use in a communications network employing Proxy Mobile IP. The apparatus comprising a transmitter for sending a route update request message to a mobility anchor function, the route update request message containing a specification of a traffic flow to be re-routed from a first interface of the multi-homed mobile node, having a first IP address, to a second interface of the multi-homed mobile node, having a second IP address, a receiver for receiving a route update message from the mobility anchor function, the route update message acknowledging acceptance of the route update request, a binding unit for creating an association between the first IP address and the second IP address for the specified traffic flow, and a transmitter for sending a route update acknowledge message to the mobility anchor function.

According to a ninth aspect of the present invention there is provided an apparatus configured to provide a mobility anchor function for use in a communications network employing Proxy Mobile IP. The apparatus comprising a receiver for receiving a route update request message from a multi-homed mobile node, the route update request message containing a specification of a traffic flow to be re-routed from a first interface of the multi-homed mobile node, having a first IP address, to a second interface of the multi-homed mobile node, having a second IP address, a transmitter for sending a route update message to the mobile node, the route update message acknowledging acceptance of the route update request, a receiver for receiving a route update acknowledge message from the mobile node, and a binding unit for creating an association between the first IP address and the second IP address for the specified traffic flow.

DETAILED DESCRIPTION

There will now be described a method of providing hand-over of individual traffic flows between interfaces of a multi-homed mobile node using Proxy Mobile IPv6. The method involves adding forward and reverse address translation in mobile nodes and local mobility anchors. When a traffic flow is diverted from one interface of a mobile node to another, the IP address used in packets of that traffic flow is translated from the IP address of the original interface to the IP address of the new sending/receiving interface.

Upon reaching either the local mobility anchor for egress packets, or the mobile node for ingress packets, the translation of the IP address is then reversed, translating it back to the IP address of the original interface. All entities on the path between the mobile node and the local mobility anchor can uniquely identify the sending/receiving interface of the mobile node based on the IP source/destination address in the packets, whereas for the transport and application protocols on the mobile node, as well as for all entities beyond the local mobility anchor, the packets of the diverted traffic flow keep their original IP address even after redirection.

Figure 2:
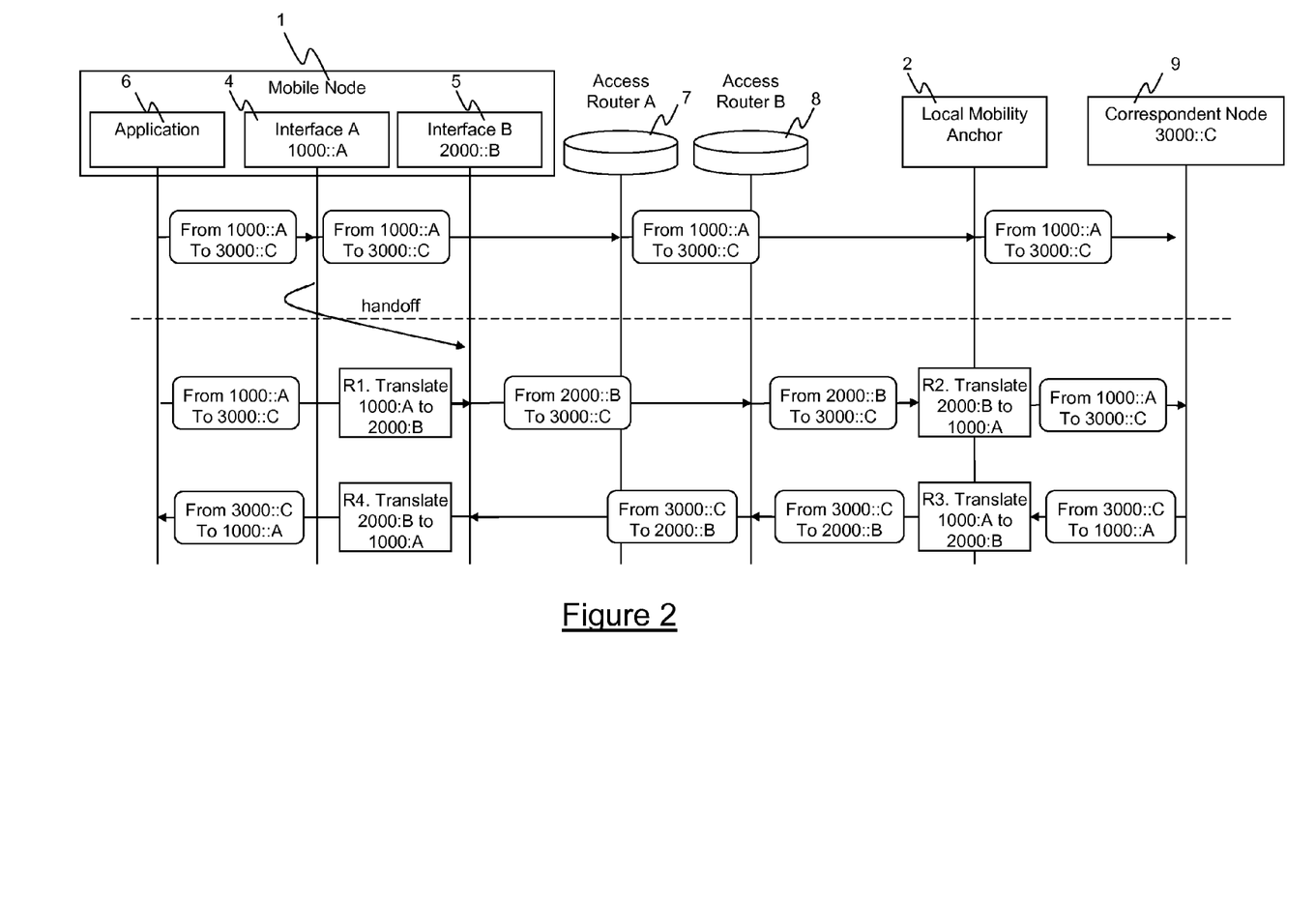
FIG. 2 illustrates an example of a time-sequence diagram for a traffic flow that is redirected between the two interfaces of a multi-homed mobile node according to an embodiment of the present invention.

FIG. 2 illustrates an example of a simplified time-sequence diagram for a traffic flow that is redirected between the two interfaces of a multi-homed mobile node 1. The multi-homed mobile node 1 has two interfaces, interface A 4 and interface B 5 and the IP addresses on these interfaces are 1000:A and 2000:B, respectively. In addition, the application layer 6 on the mobile node 1 is explicitly depicted. The two interfaces attach to access router A 7 and access router B 8 respectively, which provide the mobile access gateway functionality, and both access routers are under the realm of the same local mobility anchor 2.

The multi-homed mobile node 1 communicates with a correspondent node 9, whose IP address is 3000:C. The original traffic flow is between IP addresses 1000:A and 3000:C, as shown above the dashed line in FIG. 2. Accordingly, for egress packet handling, the flow first goes via interface A 4 of the multi-homed mobile node 1. At some point, the flow is redirected to interface B 5. The application 6 continues using IP address 1000:A, but the mobile node 1 and the local mobility anchor 2 now ensure that the IP address is translated to 2000:B whilst the packet is en-route between the mobile node 1 and the local mobility anchor 2. For outgoing packets that belong to the re-directed traffic flow the mobile node 1 translates the IP source address in each such packet, from the IP address being used on the old interface (i.e. 1000:A), to the IP address being used on the new interface (i.e. 2000:B) (see step R1). The local mobility anchor 2 then reverses this address translation (i.e. from 2000:B to 1000:A) (see step R2).

For ingress packet handling the local mobility anchor 2 forwards all ingress packets (i.e. packets sent from the correspondent node 9, towards a home network anchored at the local mobility anchor) that belong to the redirected traffic flow towards the new interface of the mobile node 1, interface B 5. The local mobility anchor 2 translates the IP destination address (i.e. 1000:A) in each such packet, received from the correspondent mobile node 9, to the IP address the mobile node 1 is using on the new interface (i.e. 2000:B) (see step R3). The mobile node 1, which also knows the description of the redirected traffic flow, reverses this address translation (see step R4). The translation is hence invisible to transport and application protocols on the mobile node 1.

Normally, a traffic flow is unambiguously identified by the combination of the sender's IP address and port number, together with the recipients IP address and port number. As such, a packet for which any of these four values differ would be identified as belonging to a different traffic flow. However, for traffic originating from a mobile node whose IP address has been translated to another IP address of the same mobile node, as is possible with the method described above, then the combination of the sender's IP address and port number, together with the recipients IP address and port number, is no longer guaranteed to be unique after translation.

For example, a multi-homed mobile node can have two traffic flows with the same correspondent node IP address, each with the same port numbers, such that the traffic flows only differ in the IP address of the mobile node. If one of these traffic flows is then transferred to another interface of the mobile node by translation of the mobile node IP address, such that the mobile node's IP address is the same for both traffic flows, it will no longer be possible to uniquely identify either traffic flow.

In order to provide that a re-directed traffic flow can be identified, and the address translation reversed, the mobile node is required to select a unique port number for each pair of a correspondent host's IP address and a correspondent host's port number. This provides that all traffic flows can be uniquely identified by the combination of the mobile's nodes port number, together with the correspondent node's IP address and port number, even after address translation. In other words, the mobile node should never have two traffic flows that only differ in the IP address of the mobile node. Whenever such a collision between two traffic flows could occur, the mobile node should choose a different port number for one of the traffic flows. This enables translation of the mobile node's IP address without causing traffic flow ambiguities.

Figure 3:
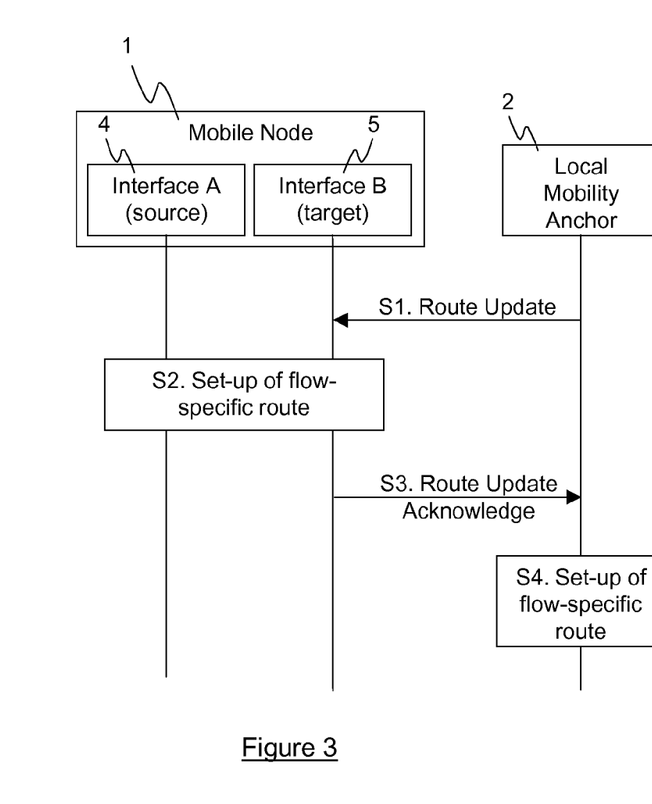
FIG. 3 illustrates a simplified signalling flow example of the hand-over a traffic flow as initiated by a local mobility anchor according to an embodiment of the present invention.

Redirection of a traffic flow can be initiated by the mobile node itself, or by the local mobility anchor in the home network. FIG. 3 illustrates a simplified signalling flow example of when a local mobility anchor 2 wants a multi-homed mobile node 1 to hand-over a traffic flow from a source interface 4 to a target interface 5 according to an embodiment of the present invention. The steps performed are as follows:

S1. The local mobility anchor sends a Route Update message to the IP address the mobile node is using on the target interface to which the flow is to be redirected. The Route Update message contains a specification of the traffic flow to be redirected.

S2. Upon receiving and validating the Route Update message, the mobile node sets up a flow-specific route for the traffic flow.

S3. The mobile node then returns a Route Update Acknowledge message to the local mobility anchor.

S4. After it has received the Route Update Acknowledge message, the local mobility anchor sets up a flow-specific route for the traffic flow.

The Route Update messages can be an extension of any existing protocol, such as Mobile IPv6 [RFC-3775], or they can be implemented as a new protocol.

Figure 4:
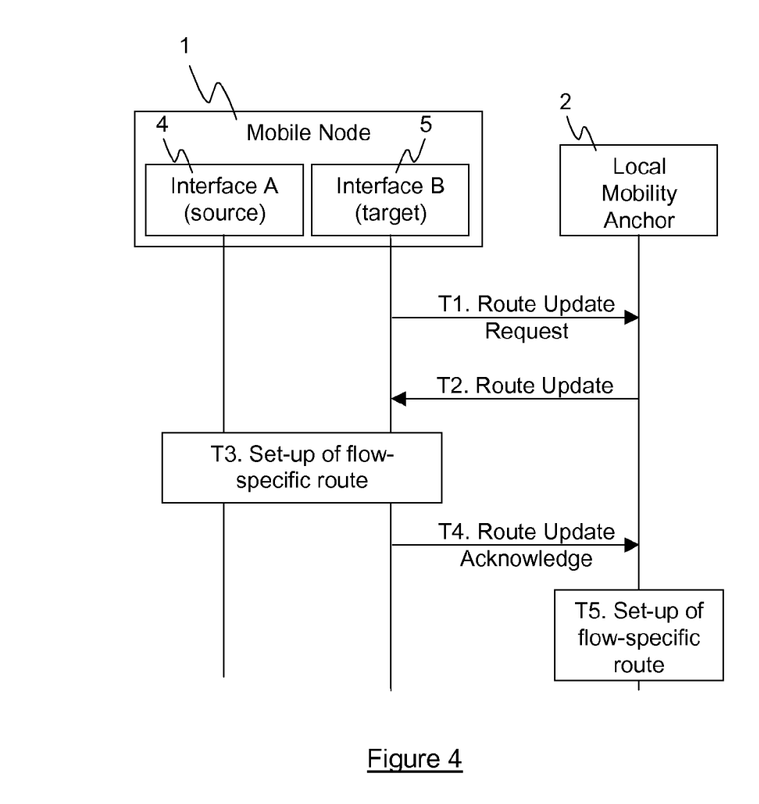
FIG. 4 illustrates a simplified signalling flow example of the hand-over a traffic flow as initiated by a mobile node according to an embodiment of the present invention.

FIG. 4 illustrates a simplified signalling flow example when the mobile node initiates a traffic flow diversion from a source interface 4 to a target interface 5 according to an embodiment of the present invention. The steps performed are as follows:

T1. The mobile node sends a Route Update Request message containing a specification of the traffic flow to the local mobility anchor.

T2. Provided that the local mobility anchor accepts the request, it sends a Route Update message to the mobile node.

T3. Upon receiving the Route Update message the mobile node sets up a flow-specific route for the traffic flow.

T4. The mobile node then returns a Route Update Acknowledge message to the local mobility anchor.

T5. After it has received the Route Update Acknowledge message, the local mobility anchor sets up a flow-specific route for the traffic flow.

Alternatively, the local mobility anchor may reject the request for a traffic flow diversion by sending a Route Update Reject message in response to the Route Update Request from the mobile node.

One way for the mobile node to address the local mobility anchor would be via a well-known anycast IP address. An anycast address is a common IP address assigned to multiple instances of the same service, and IP packets addressed to the anycast address are forwarded to the nearest instance of the anycast service. Packets destined to this anycast IP address would be forwarded to the local mobility anchor assigned to the mobile node by the mobile node's current access router Once the route has been successfully updated, this flow-specific route causes the mobile node to redirect all egress packets that belong to the redirected traffic flow via the target interface, the target interface being the interface on which the Route Update and Route Update Acknowledge messages were exchanged with the local mobility anchor. The mobile node translates the IP source address in each such packet to the IP address it has configured on that target interface. The local mobility anchor, which also knows the description of the redirected traffic flow, reverses the address translation in packets that belong to that flow before it forwards them towards the final recipient.

Figure 5:
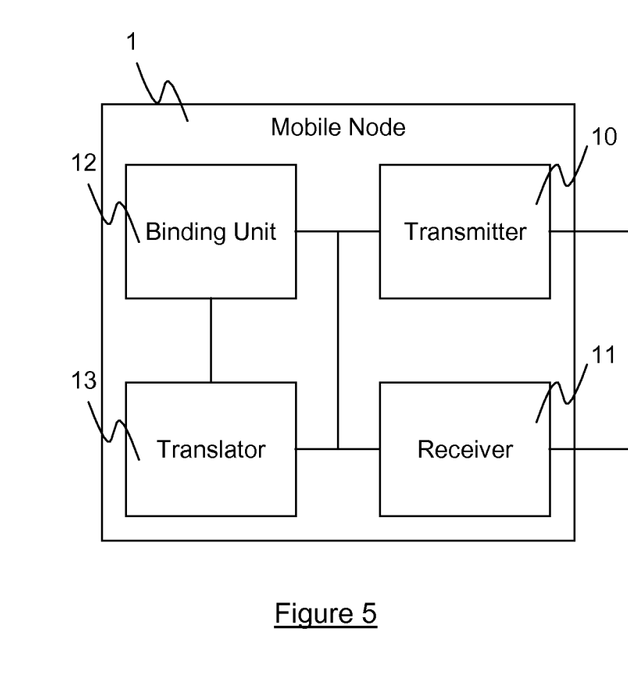
FIG. 5 illustrates schematically a mobile node according to an embodiment of the present invention.

FIG. 5 illustrates schematically a mobile node 1 suitable for implementing the methods described above. The mobile node 1 can be implemented as a combination of computer hardware and software. The mobile node 1 comprises a transmitter 10 for sending the Route Update Request message and the Route Update Acknowledge message to the local mobility anchor, a receiver 11 for receiving the Route Update message from the local mobility anchor, and a binding unit 12 for creating an association between the source interface IP address and the target interface IP address for the traffic flow to be re-directed. When initiated by the local mobility anchor 2, the traffic flow to be re-directed is specified in the Route Update message. The mobile node may further comprise a translator 13 for performing the forward and reverse address translation between the source interface IP address and the target interface IP address for routing packets of the re-directed traffic flow.

Figure 6:
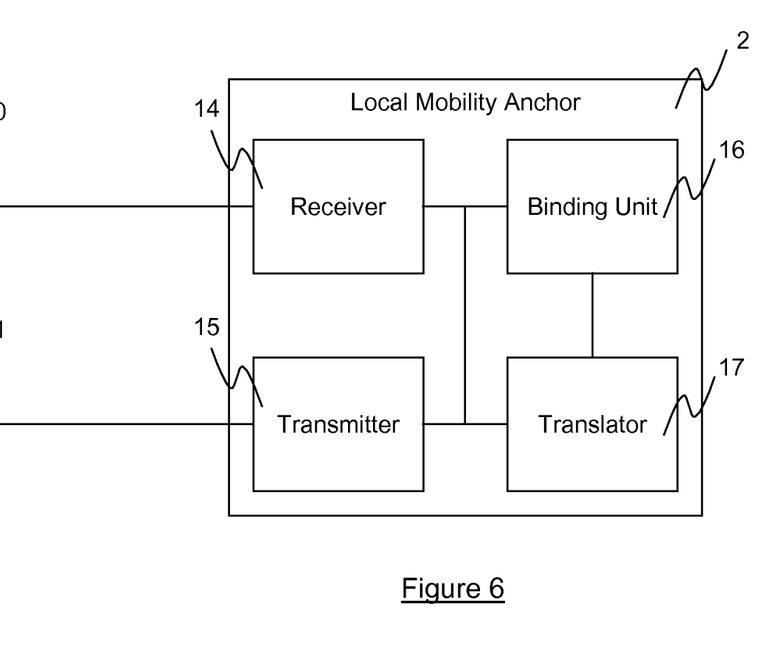
FIG. 6 illustrates schematically a local mobility anchor according to an embodiment of the present invention.

FIG. 6 illustrates schematically a local mobility anchor 2 suitable for implementing the methods described above. The local mobility anchor 2 can be implemented as a combination of computer hardware and software. The local mobility anchor 2 comprises a receiver 14 for receiving the Route Update Request message and the Route Update Acknowledge from the mobile node, a transmitter 15 for the Route Update message to the mobile node, and a binding unit 16 for creating an association between the source interface IP address and the target interface IP address for the traffic flow to be re-directed. When initiated by the mobile node 1, the traffic flow to be re-directed is specified in the Route Update Request message. The local mobility anchor 2 may further comprise a translator unit 17 for performing the forward and reverse address translation between the source interface IP address and the target interface IP address for routing packets of the re-directed traffic flow.

The method described here provides that the IP address translation makes traffic flow redirection transparent to all entities between a mobile node and the local mobility anchor that have negotiated the diversion. This in turn provides that most of the entities in an Evolved Packet System need not be modified to implement the method.

In an Evolved Packet System serving gateways performs the role of access routers. Serving gateways assume a single IP address per attached interface, and they use this IP address to identify an attached mobile node. Traffic flow redirection without address translation would therefore necessitate upgrades to serving gateways, because a mobile node (and the binding list update entry for the mobile node) may then have to be identified by multiple IP addresses. The method described above ensures that a mobile node uses the same IP address in all packets it sends via a given interface, even if the packets belong to a flow that was redirected between interfaces. Serving gateways can hence continue to identify an attached mobile node based on the IP source/destination address of egress/ingress packets.

Potentially, a mobile node may connect to a serving gateway via additional routers. These routers would also have to know about the diversion of a traffic flow if IP addresses were not translated. IP address translation makes the traffic flow diversion transparent to routers between a mobile node and a serving gateway.

In an Evolved Packet System quality-of-service provisioning is controlled by Policy Charging Rule Functions. Policy Charging Rule Functions use the IP address of a mobile node interface to map control sessions, maintained for the mobile node, with a PDN gateway and with a serving gateway. In doing so, they assume that a mobile node has one IP address on each of their interfaces, and that all packets that traverse the interface are sent from or directed to that IP address. Redirecting traffic flows between interfaces of a multi-homed mobile node without address translation would defeat this assumption and therefore necessitate upgrades to Policy Charging Rule Functions. The upgrades can be avoided if IP addresses in redirected packets are translated such that they match the interface via which the packets are sent/received, as described above.

The method described also enables the network to initiate redirection of packet flows and to deny redirection requests initiated by a mobile node. Furthermore, address translation ensures that mobile node always uses an IP address that is configured on the sending/receiving interface. The mobile node's IP address that appears in packets is hence guaranteed to topologically match the subnet prefixes valid on the access link via which the packets are transmitted. This avoids conflicts with other protocols that assume or enforce this behaviour, such as ingress filtering and unicast reverse-path forwarding, which validate IP source addresses in packets and drop those packets of which the IP source address does not correspond to a topologically correct subnet prefix.

It will be appreciated by the person of skill in the art that various modifications may be made to the above-described embodiments without departing from the scope of the present invention.

The invention claimed is:

1. A method of routing traffic in a communications network employing Proxy Mobile IP, the method comprising:
   transferring a traffic flow, intended for a target node via a mobility anchor function, from a first interface of a multi-homed mobile node, having a first IP address, to a second interface of the multi-homed mobile node, having a second IP address;
   selecting a unique port number for the mobile node, the unique port number based on a combination of an IP address of the target node and a port number of the target node;
   wherein the unique port number is used with the IP address of the target node and the port number of the target node to uniquely identify the traffic flow;
   for traffic sent from the mobile node:
      at the mobile node, translating the IP address used in packets of the traffic flow from the first IP address to the second IP address, while maintaining the first IP address for use by an application residing on the mobile node;
      upon reaching the mobility anchor function, translating the IP addresses used in the packets of the traffic flow from the second IP address back to the first IP address, before forwarding the packets to the target node;
   for traffic sent from the target node to the mobile node:
      at the mobility anchor function translating the IP address used in packets of the traffic flow from the first IP address to the second IP address, while maintaining the first IP address for use by an application residing on the mobility anchor function; and
   upon reaching the mobile node, translating the IP addresses used in the packets of the traffic flow from the second IP address back to the first IP address.

2. A method of routing traffic at a multi-homed mobile node employing Proxy Mobile IP, the method comprising:
   transferring a traffic flow, intended for a target node via a mobility anchor function, from a first interface of the multi-homed mobile node, having a first IP address, to a second interface of the multi-homed mobile node, having a second IP address;
   selecting a unique port number for the mobile node, the unique port number based on a combination of an IP address of the target node and a port number of the target node;
   wherein the unique port number is used with the IP address of the target node and the port number of the target node to uniquely identify the traffic flow;
   for traffic sent from the mobile node:
      translating the IP address used in packets of the traffic flow from the first IP address to the second IP address, while maintaining the first IP address for use by an application residing on the mobile node;
      wherein, upon reaching the mobility anchor function, the IP addresses used in the packets of the traffic flow are translated from the second IP address back to the first IP address, before the packets are forwarded to the target node;
   for traffic sent from the target node to the mobile node, wherein, at the mobility anchor function, the IP address used in packets of the traffic flow has been translated from the first IP address to the second IP address, while maintaining the first IP address for use by an application residing on the mobility anchor function:
      upon reaching the mobile node, translating the IP addresses used in the packets of the traffic flow from the second IP address back to the first IP address.

3. A method of routing traffic at a mobility anchor function employing Proxy Mobile IP, in which a traffic flow, intended for a target node via the mobility anchor function, has been transferred from a first interface of a multi-homed mobile node, having a first IP address, to a second interface of the multi-homed mobile node, having a second IP address, the method comprising:
  selecting a unique port number for the mobile node, the unique port number based on a combination of an IP address of the target node and a port number of the target node;
  wherein the unique port number is used with the IP address of the target node and the port number of the target node to uniquely identify the traffic flow;
  for traffic sent from the mobile node, wherein, at the mobile node, the IP address used in packets of the traffic flow from the first IP address has been translated to the second IP address, while maintaining the first IP address for use by an application residing on the mobile node:
    upon reaching the mobility anchor function, translating the IP addresses used in the packets of the traffic flow from the second IP address back to the first IP address, and then forwarding the packets to the target node;
  for traffic sent from the target node to the mobile node:
    at the mobility anchor function translating the IP address used in packets of the traffic flow from the first IP address to the second IP address, while maintaining the first IP address for use by an application residing on the mobility anchor function; and
    wherein, upon reaching the mobile node, the IP addresses used in the packets of the traffic flow are translated from the second IP address back to the first IP address.

4. An apparatus configured to provide a mobility anchor function for use in a communications network employing Proxy Mobile IP, and comprising:
  a transmitter for sending packets, received from a target node, to a multi-homed mobile node;
  a receiver for receiving packets, intended for the target node, from the multi-homed mobile node; and
  a processing unit configured for selecting a unique port number for the mobile node, the unique port number based on a combination of an IP address of the target node and a port number of the target node, and wherein the unique port number is used with the IP address of the target node and the port number of the target node to uniquely identify the traffic flow;
  a translator unit;
  wherein, for traffic sent from the mobile node, where, at the mobile node, the IP address used in packets of the traffic flow has been translated from the first IP address to the second IP address, while maintaining the first IP address for use by an application residing on the mobile node, the translator unit is configured for:
    upon reaching the mobility anchor function, translating the IP addresses used in the packets of the traffic flow from the second IP address back to the first IP address, and then forwarding the packets to the target node;
  wherein, for traffic sent from the target node to the mobile node, the translator unit is configured for:
    at the mobility anchor function translating the IP address used in packets of the traffic flow from the first IP address to the second IP address, while maintaining the first IP address for use by an application residing on the mobility anchor function; and
    wherein, upon reaching the mobile node, the IP addresses used in the packets of the traffic flow are translated from the second IP address back to the first IP address.

5. An apparatus configured to operate as a multi-homed mobile node for use in a communications network employing Proxy Mobile IP, and comprising:
  a transmitter for sending packets to, intended for a target node, via a mobility anchor function;
  a receiver for receiving packets, sent from the target node, from the mobility anchor function; and
  a processing unit configured for selecting a unique port number for the mobile node, the unique port number based on a combination of an IP address of the target node and a port number of the target node, and wherein the unique port number is used with the IP address of the target node and the port number of the target node to uniquely identify the traffic flow;
  a translator unit;
  wherein, for traffic sent from the mobile node, the translator unit is configured for:
    translating the IP address used in packets of the traffic flow from the first IP address to the second IP address, while maintaining the first IP address for use by an application residing on the mobile node;
    wherein, upon reaching a mobility anchor function, the IP addresses used in the packets of the traffic flow are translated from the second IP address back to the first IP address, before forwarding the packets to the target node;
  wherein, for traffic sent from the target node to the mobile node, where, at the mobility anchor function, the IP address used in packets of the traffic flow has been translated from the first IP address to the second IP address, while maintaining the first IP address for use by an application residing on the mobility anchor function, the translator unit is configured for:
    upon reaching the mobile node, translating the IP addresses used in the packets of the traffic flow from the second IP address back to the first IP address.

* * * * *